(12) United States Patent
Sachs et al.

(10) Patent No.: US 7,698,328 B2
(45) Date of Patent: Apr. 13, 2010

(54) USER-DIRECTED SEARCH REFINEMENT

(75) Inventors: Matthew G. Sachs, Waltham, MA (US); Jonathan A. Sagotsky, Waltham, MA (US)

(73) Assignee: Apple Inc., Cupertino, CA (US)

( * ) Notice: Subject to any disclaimer, the term of this patent is extended or adjusted under 35 U.S.C. 154(b) by 265 days.

(21) Appl. No.: 11/503,038

(22) Filed: Aug. 11, 2006

(65) Prior Publication Data

US 2008/0040325 A1  Feb. 14, 2008

(51) Int. Cl.
    *G06F 17/30* (2006.01)
(52) U.S. Cl. .................. 707/706; 707/748; 707/749
(58) Field of Classification Search .............. 707/3–6, 707/104.1; 704/9–10
    See application file for complete search history.

(56) References Cited

U.S. PATENT DOCUMENTS

| 5,933,822 | A * | 8/1999 | Braden-Harder et al. ....... 707/5 |
| 6,453,315 | B1 * | 9/2002 | Weissman et al. .............. 707/5 |
| 7,516,123 | B2 * | 4/2009 | Betz et al. ..................... 707/3 |
| 2003/0187844 | A1 * | 10/2003 | Li et al. ......................... 707/7 |
| 2004/0122656 | A1 * | 6/2004 | Abir .............................. 704/4 |
| 2005/0080780 | A1 * | 4/2005 | Colledge et al. ............... 707/4 |
| 2005/0108001 | A1 * | 5/2005 | Aarskog ....................... 704/10 |
| 2005/0131951 | A1 * | 6/2005 | Zhang et al. ............. 707/104.1 |
| 2005/0149510 | A1 * | 7/2005 | Shafrir ......................... 707/3 |
| 2006/0047632 | A1 * | 3/2006 | Zhang ........................... 707/3 |
| 2006/0117002 | A1 * | 6/2006 | Swen ............................. 707/4 |
| 2006/0235841 | A1 * | 10/2006 | Betz et al. ..................... 707/5 |
| 2007/0011154 | A1 * | 1/2007 | Musgrove et al. .............. 707/5 |
| 2007/0016563 | A1 * | 1/2007 | Omoigui ....................... 707/3 |
| 2007/0050393 | A1 * | 3/2007 | Vogel et al. ................. 707/102 |
| 2007/0185831 | A1 * | 8/2007 | Churcher ...................... 707/3 |
| 2007/0192293 | A1 * | 8/2007 | Swen ............................. 707/3 |
| 2008/0046422 | A1 * | 2/2008 | Lee et al. ....................... 707/5 |
| 2008/0195601 | A1 * | 8/2008 | Ntoulas et al. ................. 707/5 |

* cited by examiner

*Primary Examiner*—Don Wong
*Assistant Examiner*—Hanh B Thai
(74) *Attorney, Agent, or Firm*—Fish & Richardson P.C.

(57) ABSTRACT

A search query is used to search on a corpus of documents. A statistical collocation analysis is performed on the search results. A list of collocations is determined and can be presented to a user. The search can be refined by modifying the search query, so that the search results include documents with desirable collocations or exclude documents with undesirable collocations.

21 Claims, 6 Drawing Sheets

USER-DIRECTED SEARCH REFINEMENT

TECHNICAL FIELD

The subject matter of this application is generally related to online searching.

BACKGROUND

When performing search queries of large corpora (e.g., the Internet), many irrelevant documents are often included in the search results because they contain all of the query terms. For example, a user searching for reviews of a particular model of camera may search for the name of the camera. In addition to the desired reviews, many online stores selling the camera may be returned, and these results may dominate the top of the result set. A conventional technique that users can apply to refine the search results is to add one or more terms to the query, such as the term "review." Many online stores, however, allow shoppers to submit product reviews, so some of those documents may contain text, such as "Be the first to review this product," making the refinement ineffective.

SUMMARY

The deficiencies described above are overcome by the disclosed implementations of user-defined search refinement. A search query is used to search on a corpus of documents. A statistical collocation analysis is performed on the search results. A list of collocations is determined and can be presented to a user. The search can be refined by modifying the search query, so that the search results include documents with desirable collocations or exclude documents with undesirable collocations.

In some implementations, a method includes: receiving a first search query including one or more search terms; providing a first set of documents responsive to the first query; determining one or more collocations from the first set of documents that include at least one of the search terms; receiving input specifying inclusion or exclusion of documents from the first set of documents that contain at least one of the collocations; refining the first search query to produce a second query based on the input; and providing a second set of documents responsive to the second query, where the second set of documents includes or excludes documents containing the specified collocation.

In some implementations, a method includes: receiving a search query including query terms; retrieving a first set of documents responsive to the query terms; retrieving collocations associated with the query terms; scoring the collocations; and presenting a result set of documents including collocations having scores meeting a predetermined criteria.

Other implementations of user-defined search refinement are disclosed, including implementations directed to systems, methods, apparatuses, computer-readable mediums and user interfaces.

DETAILED DESCRIPTION

User-Directed Search Refinement Overview

Figure 1:
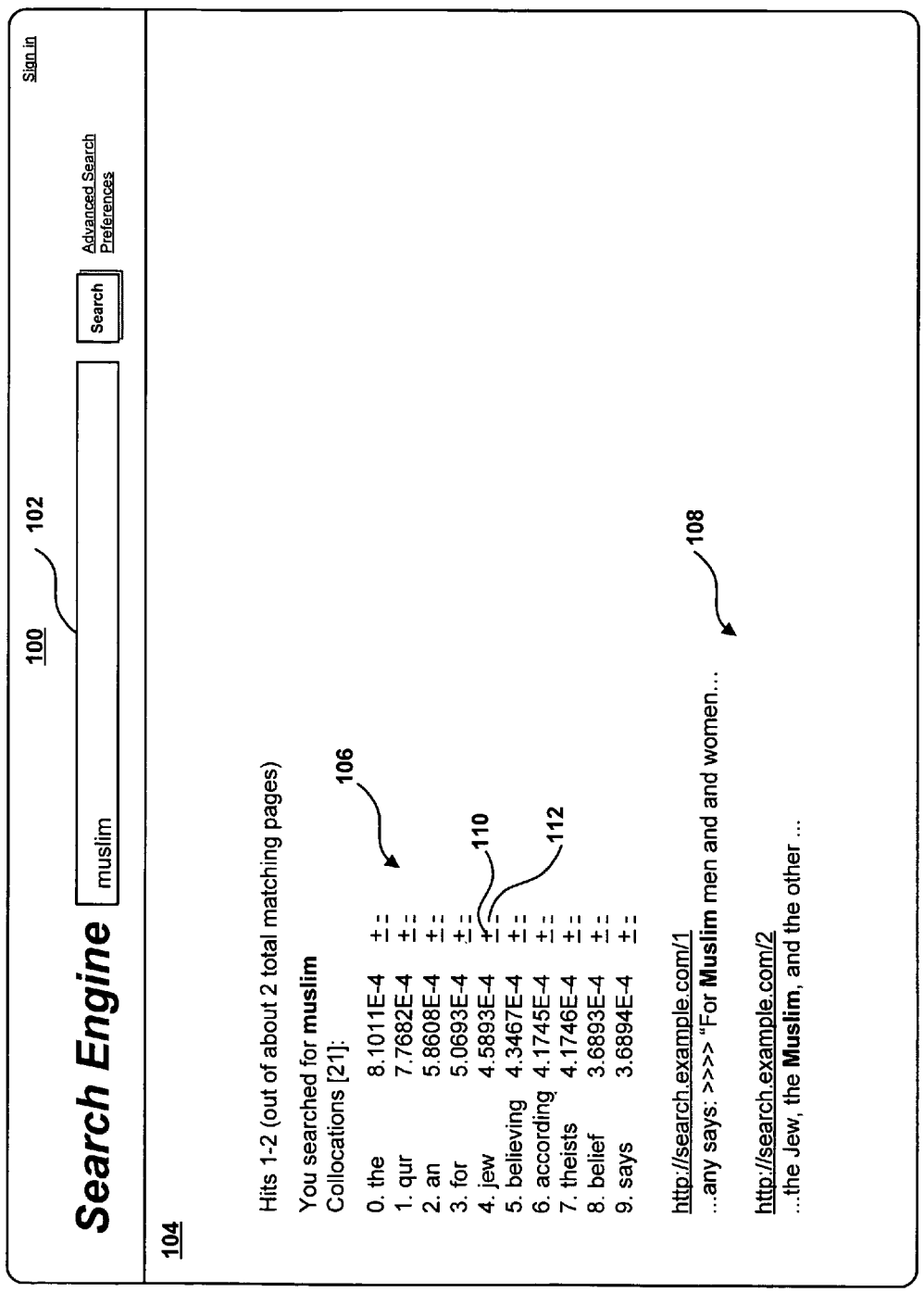
FIG. 1 is a screenshot of an exemplary search engine user interface for presenting search results and collocates associated with query terms.

FIG. 1 is a screenshot of an exemplary search engine user interface 100 for presenting search results 108 and collocates 106 associated with query terms. Queries can include one or more terms and can be input into a search engine in a variety of ways (e.g., a keyboard, speech recognition). In the example shown, the query includes the term "muslim," which was entered in a search box 102. The search results 108 for "muslim" include documents that contain the term "muslim" (as indicated in bold type). Documents can include web pages, emails, applications, instant messages, text documents, audio files, video files, or any other data or applications that may reside on one or more computer systems. The search results 108 can be displayed on a display screen of a variety of electronic devices (e.g., personal computers, mobile phones, personal digital assistants (PDAs), game consoles, tables, television screens, etc.) or output as audio. In the example shown, there are twenty-one collocates 106 which form collocations with the term "muslim." Only the top N (e.g., 10) collocates 106 are presented to the user.

Generally, "collocations" are words that co-occur in a document for semantic rather than lexical reasons. For example, in the sentence "a collocation is a pair of words which appear near each other, such that it is interesting that they do so," the word pair ("words", "appear") are not a collocation, since those words are near each other due to sentence syntax. The words are not semantically related to each other. By contrast, the word pair ("collocation," "pair") is a collocation, since those terms are semantically related, they appear near each other for reasons other than just the syntax of English.

There are several known statistical tests which can be used to determine whether two words form a meaningful collocation. Examples of suitable statistical tests include but are not limited to: mutual information test, t test, log-likelihood, Pearson's chi-square, cubic association ratio, Frager and McGowan coefficient, etc. For each collocate 106 which forms a collocation with the query term "muslim," a test score is determined. In the example shown, the collocation ("jew", "muslim") produced a mutual information test score of 4.5893E-4. The mutual information score I of two discrete random variables X and Y can be defined mathematically as:

$$I(X;Y) = \sum_{y \in Y} \sum_{x \in X} p(x,y) \log \frac{p(x,y)}{p(x)p(y)}$$

where p(x,y) is the joint probability distribution function of X and Y, and p(x) and p(y) are the marginal probability distribution functions of X and Y, respectively.

In search engine applications, the marginal probability distribution functions p(x) and p(y) of terms X and Y can be computed by counting how often each of the terms appear in a corpus and dividing the functions by the total number of tokens associated with the corpus. The joint probability function p(x,y) (hereinafter also referred to as the juxtaposition probability) of the terms X and Y can be determined by counting how often the terms appear within a certain number of positions of each other in the corpus (i.e., non-adjacent proximity).

The collocates 106 (words which form collocations with the query term) are potentially useful for refining a query. The collocates 106 can be provided to the user as "suggested" refining terms. Referring to the camera example discussed above, the term "camera" could form a meaningful collocation with the query term "PowerShot®," a camera brand name. Using the mutual information test, a term like "camera," which provides a meaningful collocation with "PowerShot®," will receive a high mutual information score, since "PowerShot®" and "camera" are semantically related. By contrast, a common term like "table," which does not provide a meaningful collocation with "PowerShot®," will receive a low mutual information score, since "table" and "PowerShot®" are not semantically related.

In some implementations, a list of collocates can be generated and the collocates with the top N highest scores can be displayed or otherwise output to the user. One or more user interface elements (e.g., links) can be displayed with each collocate for allowing the user to refine the result set to include or exclude documents which contain the collocation. In the example shown, clicking on a "+" link 110 will refine the result set to only include documents which contain the collocation pair ("muslim", "jew"). Similarly, clicking on the "−" link 112 will refine the result set to exclude documents which contain the collocation pair ("muslim", "jew").

Figure 2:
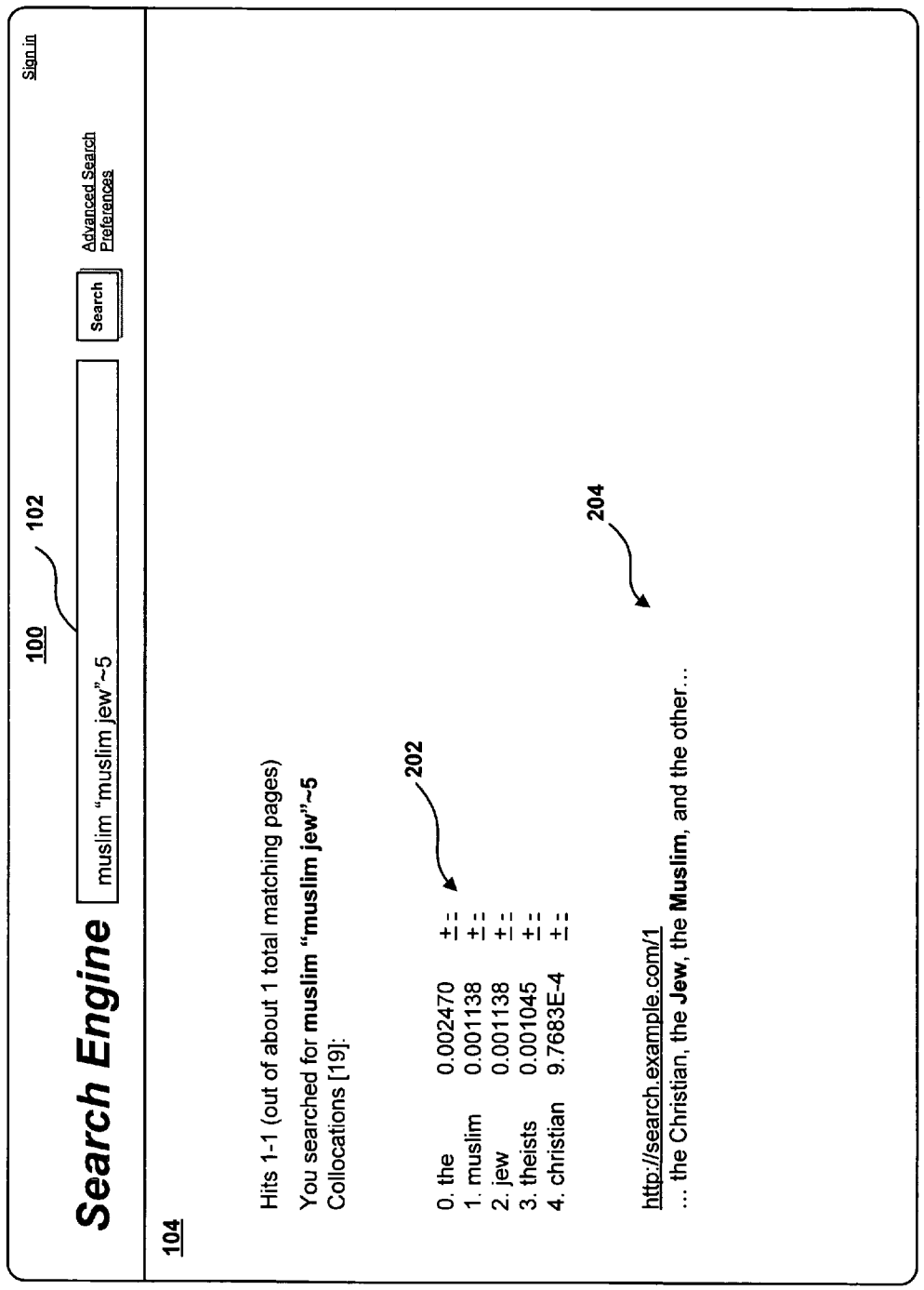
FIG. 2 is a screenshot of the search engine user interface of FIG. 1 showing a first refined result set.

FIG. 2 is a screenshot of the search engine user interface 100 showing a refined result set 204 that was generated from the original result set 108 by a user clicking the "+" link 110. In response to the click, the search query "muslim" in the search box 102 is expanded to muslim "muslim jew"~5, which results in a filtering of the result set 108 and a new list of collocates 202 which are computed from the refined result set 204 the syntax "~5" is a proximity phrase syntax, which matches documents which contain the terms "muslim" and "jew" within five positions of each other in a document. The number five is an example and any desired number can be used in the proximity phrase syntax. Thus, a user of the search engine can filter the original result set 108 based on the mutual information test scores assigned to the documents in the result set 108 by clicking on or otherwise interacting (e.g., mouse over) with the "+" link 110 next to the desired collocate 106. In the example shown, the refined result set 204 includes documents where "muslim" and "jew" are within five positions of each other in a given document.

Figure 3:
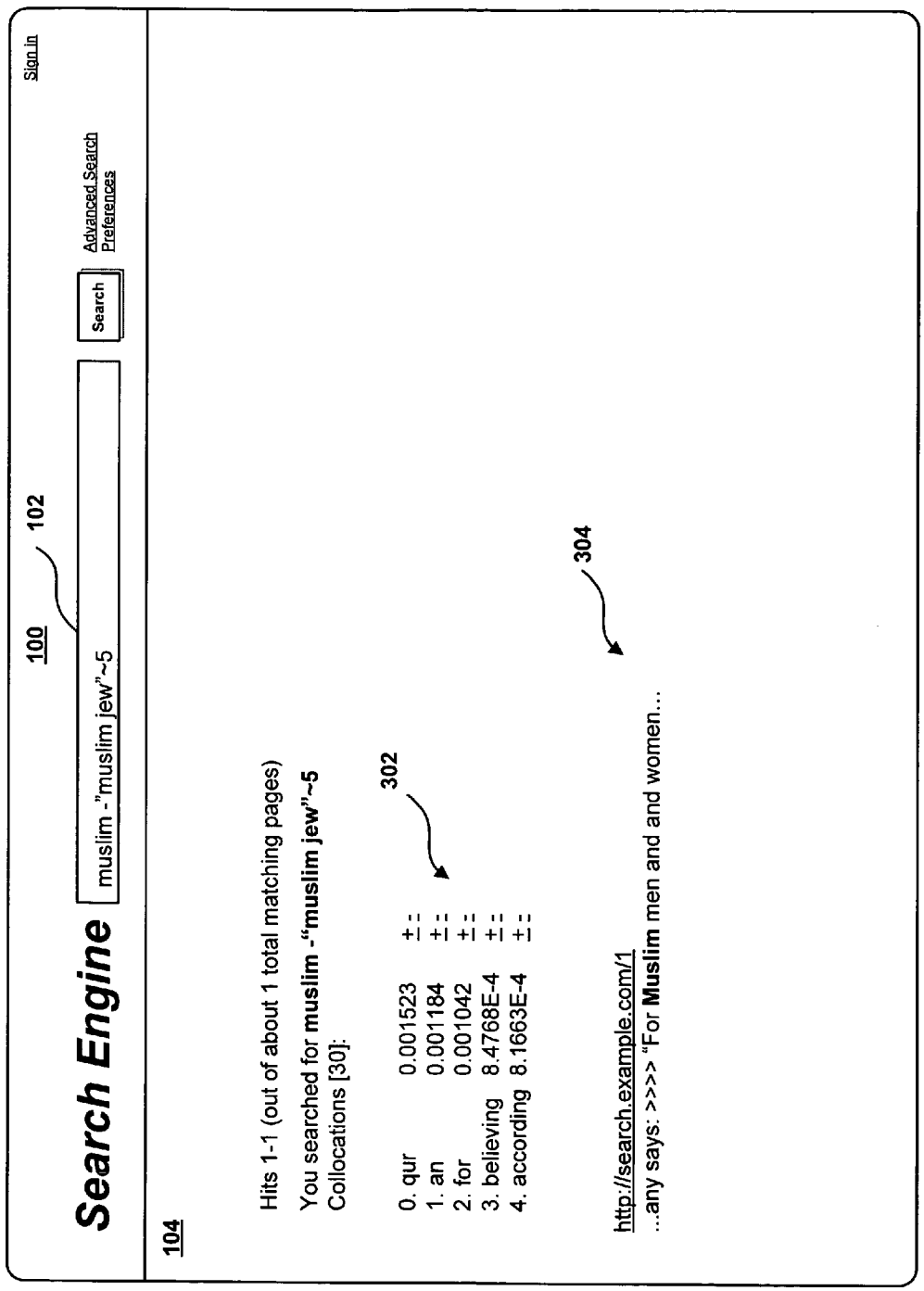
FIG. 3 is a screenshot of the search engine user interface of FIG. 1 showing a second refined result set.

FIG. 3 is a screenshot of the search engine user interface 100 of FIG. 1 showing a refined result set 304 that was generated from the original result set 108 by a user clicking the "−" link 112. In response to the click, the search query "muslim" in the search box 102 is expanded to muslim ~"muslim jew"~5, which results in a filtering of the original result set 108 and a new list of collocates 302 which are computed from documents in the new result set 304. Thus, a user of the search engine can filter the result set 108 based on the mutual information test scores assigned to the documents in the result set 108 by clicking on or otherwise interacting (e.g., mouse over) with the "−" link 112. In the example shown, the new result set 304 excludes documents where "muslim" and "jew" are within five positions of each other in a given document.

The implementation described above is transparent to the user. Unlike conventional solutions, which attempt to perform document clustering using machine learning algorithms, the user can see exactly how their query will be refined in an easily-understood form, and it mimics a strategy that many users will manually apply when attempting to refine a query. It also adapts itself to the result set, instead of attempting to define fixed categories. Finally, seeing the set of collocates for query terms can produce surprising results, providing a fun user experience.

User-Directed Search Refinement Process

Figure 4:
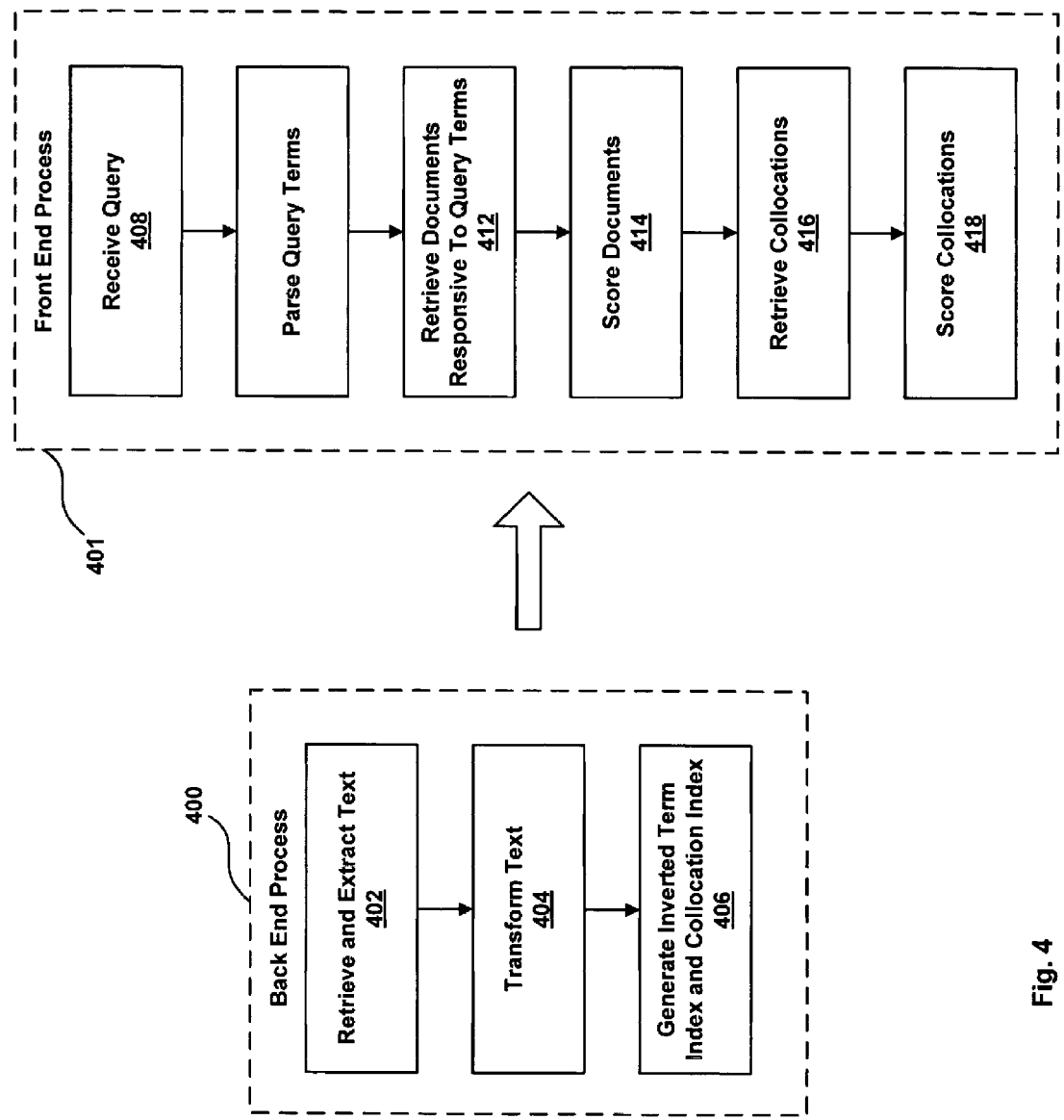
FIG. 4 is flow diagram of an exemplary user-directed search refinement process.

FIG. 4 is flow diagram of an exemplary user-directed search refinement process 400. In some implementations, the process 400 includes a back-end process 400 and a front-end process 401. The back-end process 400 begins by receiving and extracting text from documents in a corpus of documents (402). An example of a corpus of documents are the documents that can be found on the Internet. The process 400, however, can operate on any corpus of documents (e.g., legal document database, a library database, Reuters corpus, 20 Newsgroups data set (20NG), documents accessible on an intranet or other proprietary or public network). If the corpus includes documents accessible through the World Wide Web ("Web"), then the retrieving and extracting of text can be performed by a Web crawler. An example of a Web crawler is the open source Nutch™ crawler which fetches pages from the Web and turns them into an inverted index. The inverted index can then be used by a Nutch™ search engine to respond to search queries. The Nutch™ search engine and crawler are publicly available from the Apache Software Foundation (Forest Hill, Md.).

After the text is received and extracted it can be transformed into a suitable form for indexing (404). For example, the text can be tokenized and/or normalized (e.g., URL normalization, stemming, lemmatization). These transformations can be performed using known techniques. For example, URL normalization can be performed using techniques described in Sang Ho Lee, Sung Jin Kim, and Seok Hoo Hong, "On URL normalization," *Proceedings of the International Conference on Computational Science and its Applications (ICCSA* 2005), 1076-1085. Examples of known stemming algorithms include the Paice/Husk, Porter, Lovins, Dawson and Krovetz stemming algorithms. The transformed text can then be used to generate an inverted term index and a collocation index (406).

An inverted term index is an index structure that stores a mapping from words to their locations in a document or a set of documents. In some implementations, the inverted term index can be a full inverted term index which contains information about where in the documents the words appear. A full inverted term index can be implemented as a list of pairs of document IDs and local positions. The creation of inverted term indexes is well-known and described in publicly available search engine literature. The collocation index can be built from the inverted term index, as described in reference to FIG. 5. In some implementations, the collocation index includes mappings of collocation pairs (term X, term Y) to their frequency of occurrence in a document.

The front-end process 401 begins by receiving a query from a user or from another program or device (408). A parser parses the query terms (410). The parsed terms are then used to retrieve a result set of documents from a repository that contain one or more of the parsed query terms (412). The result set of documents are scored (414) (e.g., scored based on page ranks) and collocations found in the documents are retrieved (416) from the collocation index and scored (418) (e.g., scored based on statistical tests). In implementations that use the mutual information test, the scores can be determined based on the tokens and collocation counts of the documents in the result set. The result set is used as the corpus instead of all the documents in the inverted index to eliminate collocates that do not appear in the result set. Such collocates may not produce useful refinement of the results because including them would result in an empty result set, and excluding them would not remove any documents. In some implementations, the top N collocates with the highest mutual information scores can be presented to the user, together with links which will add and remove the collocates from the query. Other criteria and rating systems can be applied as desired to determine which collocates will be presented to the user. For example, the top x % of results could be presented to the user. The process 400 could also be combined with other known search techniques, such as document ranking based on content, hits, links to other documents, relevance feedback, etc.

Some terms in the corpus which have high mutual information scores may be hapax legomena terms, which are terms that only occur once in a given document. For example, a query on "muslims" may suggest the collocate "bingo," if "bingo" only appears once in a given document with "muslims." In such a case, "bingo" may be presented to the user as top N collocation with "muslims." Such a result implies that "bingo" is an important part of the Muslim religion, which is not the desired result. In some implementations, to address this issue any collocations having a frequency count f=1 can be filtered out. Alternatively, a different metric could be applied, such as a metric described in Manning, C. D. and Schuetze, H. (1999). "Foundations of Statistical Natural Language Processing," The MIT Press, Cambridge Mass., 1999, which article is incorporated by reference herein in its entirety. In some implementations, ratings within collocations can be used to remove hapax legomena terms from the list of collocates. For example, the mutual information score of each collocation could be multiplied by the frequency of each collocation to generate a collocation score which biases the results in favor of more frequent collocations.

Collocation Index Creation Process

Figure 5:
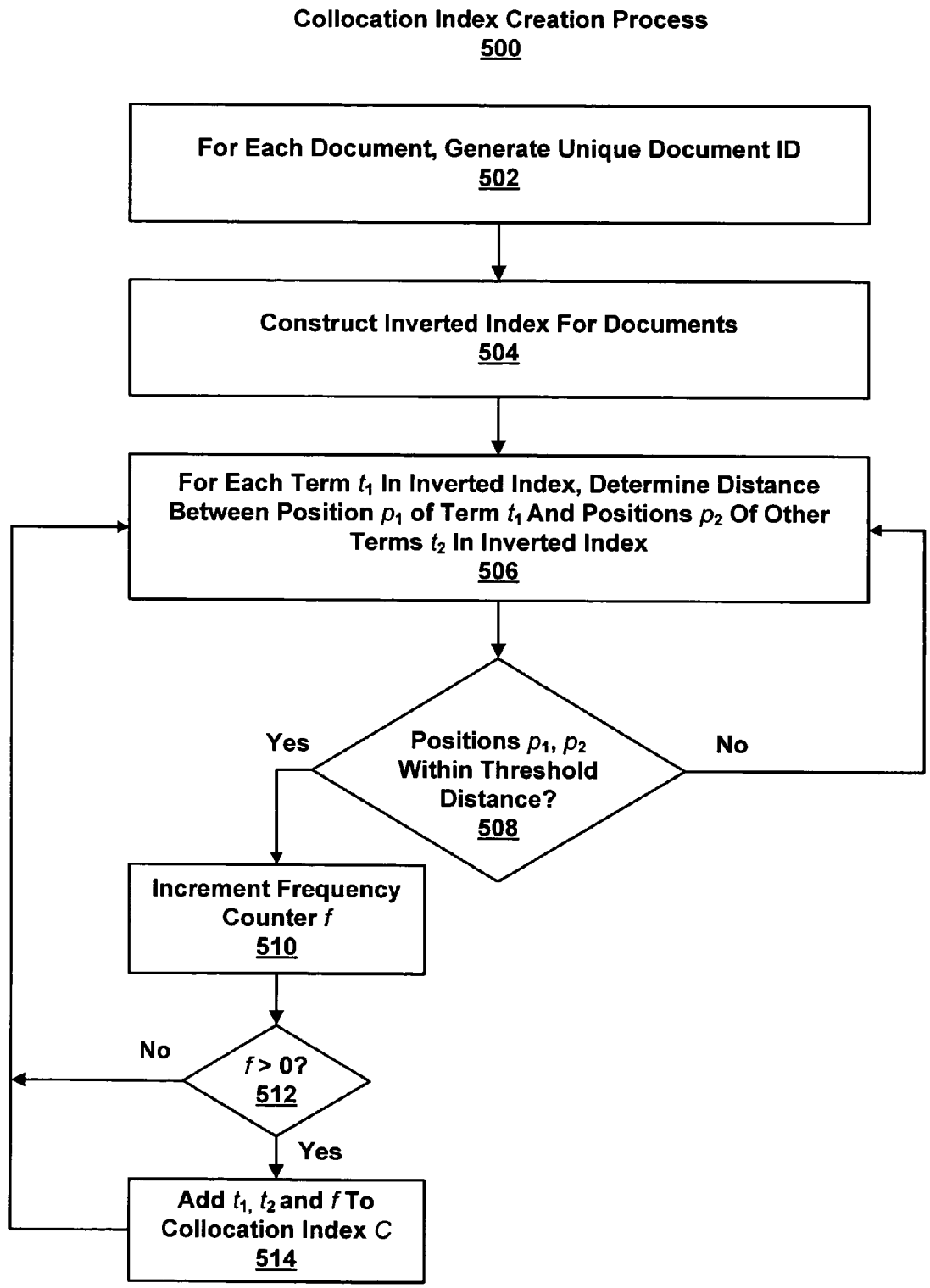
FIG. 5 is flow diagram of an exemplary collocation index creation process.

FIG. 5 is flow diagram of an exemplary collocation index creation process 500. The process begins by generating a unique document identifier (ID) for each document in the corpus to be indexed (502). Next, an inverted index is constructed for the documents (504). A full inverted term index can be implemented as a list of pairs of document IDs and local positions. The creation of inverted term indexes is well-known and described in publicly available search engine literature.

For each term $t_1$ in the inverted index, a distance between position $p_1$ of term $t_1$ and positions $p_1$ of other terms $t_2$ in the inverted index are determined (506). In some implementations, the other terms $t_2$ can be constrained such that the terms $t_2$ follow term $t_1$ alphabetically.

The positions $p_1$, $p_2$ are the positions of the terms $t_1$, $t_2$ in a given document. If positions $p_1$, $p_2$ are within a threshold distance (508), then a frequency counter (e.g., software counter) is incremented (510), provided a frequency count f maintained by the frequency counter is greater than zero (512). Otherwise, the process 500 returns to step 506. If the frequency count f is greater than zero, then terms $t_1$, $t_2$ and their respective positions $p_1$, $p_2$ are added to the collocation index C. If the frequency count f is less than or equal to zero, then the process 500 returns to step 506. In some implementations, the terms $t_1$, $t_2$ and their respective positions $p_1$, $p_2$, are added to a file having a document ID for a filename, so that all of the collocations for a given document are stored in a single file named after the document ID. Other techniques for associating documents with collocations are possible. For example, the collocation index could include document IDs. In some implementations, the inverted index and collocation index can be combined into a single index.

System Architecture

Figure 6:
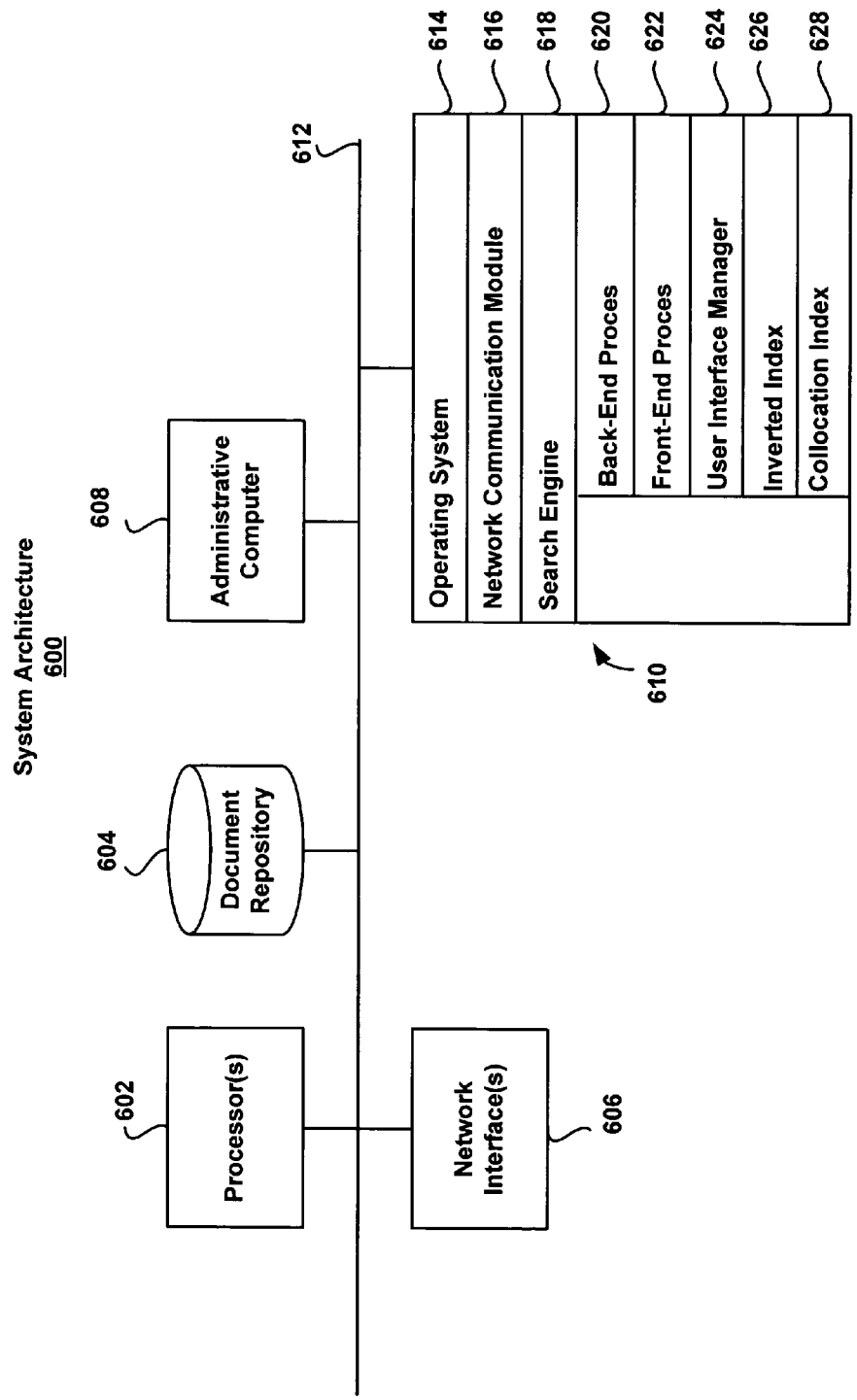
FIG. 6 is a block diagram of an exemplary system architecture for hosting the user-directed search refinement process of FIG. 4.

FIG. 6 is a block diagram of an exemplary system architecture for hosting the user-directed search refinement process of FIG. 4. In some implementations, the architecture 600 includes one or more processors 602 (e.g., dual-core Intel® Xeon® Processors), a document repository 604, one or more network interfaces 606, an optional administrative computer 608 and one or more computer-readable mediums 610 (e.g., RAM, ROM, SDRAM, hard disk, optical disk, flash memory, SAN, etc.). These components can exchange communications and data over one or more communication channels 612 (e.g., Ethernet, Enterprise Service Bus, PCI, PCI-Express, etc.), which can include various known network devices (e.g., routers, hubs, gateways, buses) and utilize software (e.g., middleware) for facilitating the transfer of data and control signals between devices.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 610 further includes an operating system 614 (e.g., Mac OS® server, Windows® NT server), a network communication module 616 and a search engine 618. The operating system 614 can be multi-user, multiprocessing, multitasking, multithreading, real time, etc. The operating system 614 performs basic tasks, including but not limited to: recognizing input from and providing output to the administrator computer 608; keeping track and managing files and directories on computer-readable mediums 610 (e.g., memory or a storage device); controlling peripheral devices (e.g., repository 604); and managing traffic on the one or more communication channels 612. The network communications module 616 includes various components for establishing and maintaining network connections (e.g., software for implementing communication protocols, such as TCP/IP, HTTP, etc.).

The search engine 618 includes a backend process 620, a front end process 622, a user interface manager 624, an inverted index 626 and a collocation index 628. The user interface manager 624 generates and manages the various user interfaces shown in FIGS. 1-3. These components were described in reference to FIGS. 1-5. These components can be implemented in software in a variety of programming languages (e.g., Objective-C).

The architecture 600 is one example of a suitable architecture for hosting the user-directed search refinement processes, described in reference to FIGS. 1-5. Other architectures are possible, which include more or fewer components. For example, the inverted index 626 and/or the collocation index 628 can be located on the same computer-readable medium or separate storage mediums. The components of architecture 600 can be located in the same facility or distributed among several facilities. The architecture 600 can be implemented in a parallel processing or peer-to-peer infrastructure or on a single device with one or more processors. The search engine 618 can include multiple software components or it can be a single body of code.

Various modifications may be made to the disclosed implementations and still be within the scope of the following claims.

What is claimed is:

1. A method, comprising:
receiving a first search query including one or more search terms;
providing a first set of documents responsive to the first query;
determining one or more collocations from the first set of documents that include at least one of the search terms, each collocation including at least one other term that is semantically related to the at least one search term;
scoring the collocations from the first set of documents, including determining a mutual information score for each collocation using a mutual information test;
multiplying at least some collocation scores by frequency counts, a frequency count for a given collocation representing a number of times the collocation occurs in a document of the first set of documents;
determining a subset of the first set of documents to present to a user based on the scored collocations;
providing one or more user interface elements, to be used by a user to include and exclude documents from the first set of documents that contain at least one specified collocation of the collocations;
receiving user input specifying inclusion or exclusion of documents from the first set of documents that contain at least one of the collocations;
refining the first search query to produce a second query based on the user input; and
providing a second set of documents responsive to the second query using one or more computers, where the second set of documents includes or excludes documents containing the specified collocation.

2. The method of claim 1, where the one or more collocations are retrieved from a collocation index.

3. The method of claim 1, where refining the first search query includes expanding the first search query using the specified collocation.

4. The method of claim 1, where the terms of at least some of the collocations are non-adjacent in at least one document in the first set of documents.

5. The method of claim 1, further comprising:
identifying collocations that include terms that occur only once in a document of the first set of documents, so the identified collocations cannot be specified by the input.

6. The method of claim 1, further comprising filtering the collocations based on the frequency count.

7. The method of claim 1, where refining the search query further comprises:
expanding the search query to include a proximity phrase syntax.

8. A computer-readable storage medium having instructions stored thereon, which, when executed by a processor, causes the processor to perform operations comprising:
receiving a first search query including one or more search terms;
providing a first set of documents responsive to the first query;
determining one or more collocations from the first set of documents that include at least one of the search terms, each collocation including at least one other term that is semantically related to the at least one search term;
scoring the collocations from the first set of documents, including determining a mutual information score for each collocation using a mutual information test;
multiplying at least some collocation scores by frequency counts, a frequency count for a given collocation representing a number of times the collocation occurs in a document of the first set of documents;
determining a subset of the first set of documents to present to a user based on the scored collocations;
providing one or more user interface elements to be used by a user to include and exclude documents from the first set of documents that contain at least one specified collocation of the collocations;
receiving user input specifying inclusion or exclusion of documents from the first set of documents that contain at least one of the collocations;
refining the first search query to produce a second query based on the user input; and
providing a second set of documents responsive to the second query, where the second set of documents includes or excludes documents containing the specified collocation.

9. The computer-readable storage medium of claim 8, where the one or more collocations are retrieved from a collocation index.

10. The computer-readable storage medium of claim 8, where refining the first search query includes expanding the first search query using the specified collocation.

11. The computer-readable storage medium of claim 8, the operations further comprising:
filtering the collocations based on the frequency count.

12. The computer-readable storage medium of claim 8, where the terms of at least some of the collocations are non-adjacent in at least one document in the first set of documents.

13. The computer-readable storage medium of claim 8, further comprising:
identifying collocations that include terms that occur only once in a document of the first set of documents, so the identified collocations cannot be specified by the input.

14. The computer-readable storage medium of claim 8, where refining the search query further comprises:
expanding the search query to include a proximity phrase syntax.

15. A system, comprising:
one or more computers configured to perform operations including:
receiving a first search query including one or more search terms;
providing a first set of documents responsive to the first query;
determining one or more collocations from the first set of documents that include at least one of the search terms, each collocation including at least one other term that is semantically related to the at least one search term;
scoring the collocations from the first set of documents, including determining a mutual information score for each collocation using a mutual information test;
multiplying at least some collocation scores by frequency counts, a frequency count for a given collocation representing a number of times the collocation occurs in a document of the first set of documents;
determining a subset of the first set of documents to present to a user based on the scored collocations;
providing one or more user interface elements to be used by a user to include and exclude documents from the first set of documents that contain at least one specified collocation of the collocations;

receiving user input specifying inclusion or exclusion of documents from the first set of documents that contain at least one of the collocations;

refining the first search query to produce a second query based on the user input; and providing a second set of documents responsive to the second query, where the second set of documents includes or excludes documents containing the specified collocation.

16. The system of claim 15, where the one or more collocations are retrieved from a collocation index.

17. The system of claim 15, where refining the first search query includes expanding the first search query using the specified collocation.

18. The system of claim 15, the operations further comprising:

filtering the collocations based on the frequency count.

19. The system of claim 15, where the terms of at least some of the collocations are non-adjacent in at least one document in the first set of documents.

20. The system of claim 15, further comprising:

identifying collocations that include terms that occur only once in a document of the first set of documents, so the identified collocations cannot be specified by the input.

21. The system of claim 15, where refining the search query further comprises:

expanding the search query to include a proximity phrase syntax.

* * * * *

UNITED STATES PATENT AND TRADEMARK OFFICE
CERTIFICATE OF CORRECTION

PATENT NO. : 7,698,328 B2  
APPLICATION NO. : 11/503038  
DATED : April 13, 2010  
INVENTOR(S) : Matthew G. Sachs et al.

Page 1 of 1

It is certified that error appears in the above-identified patent and that said Letters Patent is hereby corrected as shown below:

Drawings

On Sheet 1 of 6, in Figure 1, Reference Numeral 108, line 18, after "Muslim men and" delete "and".

On Sheet 3 of 6, in Figure 3, Reference Numeral 108, line 13, after "Muslim men and" delete "and".

On Sheet 6 of 6, in Figure 6, Reference Numeral 620, line 1, delete "Proces" and insert -- Process --, therefor.

On Sheet 6 of 6, in Figure 6, Reference Numeral 622, line 1, delete "Proces" and insert -- Process --, therefor.

In column 3, line 39, delete "204 the" and insert -- 204. The --, therefor.

In column 5, line 63, delete "t$_2$" and insert -- t$_2$, --, therefor.

In column 5, line 67, delete "t$_2$" and insert -- t$_2$, --, therefor.

In column 8, line 10, in Claim 8, delete "elements" and insert -- elements, --, therefor.

In column 8, line 64, in Claim 15, delete "elements" and insert -- elements, --, therefor.

Signed and Sealed this  
Eighth Day of November, 2011

David J. Kappos  
*Director of the United States Patent and Trademark Office*